(12) United States Patent
Huh

(10) Patent No.: US 12,172,643 B2
(45) Date of Patent: Dec. 24, 2024

(54) METHOD AND DEVICE FOR CONTROLLING REGENERATIVE BRAKING OF HYBRID VEHICLE

(71) Applicants: Hyundai Motor Company, Seoul (KR); Kia Corporation, Seoul (KR)

(72) Inventor: Jeewook Huh, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 268 days.

(21) Appl. No.: 17/828,603

(22) Filed: May 31, 2022

(65) Prior Publication Data
US 2023/0174068 A1 Jun. 8, 2023

(30) Foreign Application Priority Data
Dec. 2, 2021 (KR) .................. 10-2021-0170758

(51) Int. Cl.
| | | |
|---|---|---|
| B60W 30/18 | (2012.01) | |
| B60W 10/08 | (2006.01) | |
| B60W 10/184 | (2012.01) | |
| B60W 20/14 | (2016.01) | |

(52) U.S. Cl.
CPC ...... *B60W 30/18127* (2013.01); *B60W 10/08* (2013.01); *B60W 10/184* (2013.01); *B60W 20/14* (2016.01); *B60W 2510/18* (2013.01); *B60W 2510/244* (2013.01); *B60W 2710/083* (2013.01)

(58) Field of Classification Search
CPC ........... B60W 30/18127; B60W 10/08; B60W 10/184; B60W 20/14; B60W 2510/18; B60W 2510/244; B60W 2710/083; B60W 2540/12; B60W 10/02; B60W 10/06; B60W 10/10; B60W 10/18; B60W 40/105; B60W 2520/10; B60W 2530/13; B60K 2006/4825; B60K 6/48; B60K 6/442; Y02T 10/62; B60T 13/662; B60T 13/74; B60T 2270/60; B60Y 2200/92

See application file for complete search history.

(56) References Cited

U.S. PATENT DOCUMENTS

| | | | | |
|---|---|---|---|---|
| 10,471,833 | B2* | 11/2019 | Cho .................... | B60L 7/18 |
| 2014/0095046 | A1* | 4/2014 | Nishio ................ | B60L 7/26 |
| | | | | 701/81 |
| 2016/0129791 | A1* | 5/2016 | Huh ..................... | B60L 7/26 |
| | | | | 701/70 |

(Continued)

FOREIGN PATENT DOCUMENTS

| | | | |
|---|---|---|---|
| JP | 2001169402 A | * | 6/2001 |
| KR | 2016-0056530 A | | 5/2016 |

OTHER PUBLICATIONS

Machine translation for JP2001169402A, Jun. 22, 2001, Morisawa Kunio.*

*Primary Examiner* — Abdalla A Khaled
(74) *Attorney, Agent, or Firm* — Fox Rothschild LLP

(57) ABSTRACT

A method of controlling regenerative braking of a hybrid vehicle is provided. The method includes controlling, by a controller, a hybrid vehicle to start a braking operation in response to a brake pedal operation signal, and, after the braking operation of the hybrid vehicle is started, controlling, by the controller, a second motor that is connected to an output shaft of a transmission of the hybrid vehicle to perform regenerative braking.

15 Claims, 2 Drawing Sheets

(56) References Cited

U.S. PATENT DOCUMENTS

| | | | |
|---|---|---|---|
| 2016/0137045 A1* | 5/2016 | Zhu | B60W 20/00 |
| | | | 180/65.265 |
| 2017/0021730 A1* | 1/2017 | Ogawa | B60L 7/18 |
| 2018/0079418 A1* | 3/2018 | Iwasa | B60L 50/16 |
| 2018/0361878 A1* | 12/2018 | Akiyama | B61L 15/0058 |
| 2019/0061532 A1* | 2/2019 | Maruyama | B60T 7/042 |
| 2019/0106110 A1* | 4/2019 | Yoshida | B60L 7/26 |
| 2019/0176628 A1* | 6/2019 | Nakata | B60T 13/165 |
| 2019/0232790 A1* | 8/2019 | Honda | B60L 7/26 |
| 2021/0070263 A1* | 3/2021 | Kono | B60T 8/172 |
| 2022/0250482 A1* | 8/2022 | Åberg | B60W 30/18127 |
| 2022/0289200 A1* | 9/2022 | Hawley | B60W 10/06 |
| 2023/0150370 A1* | 5/2023 | Ostgathe | B60L 7/18 |
| | | | 303/152 |

* cited by examiner

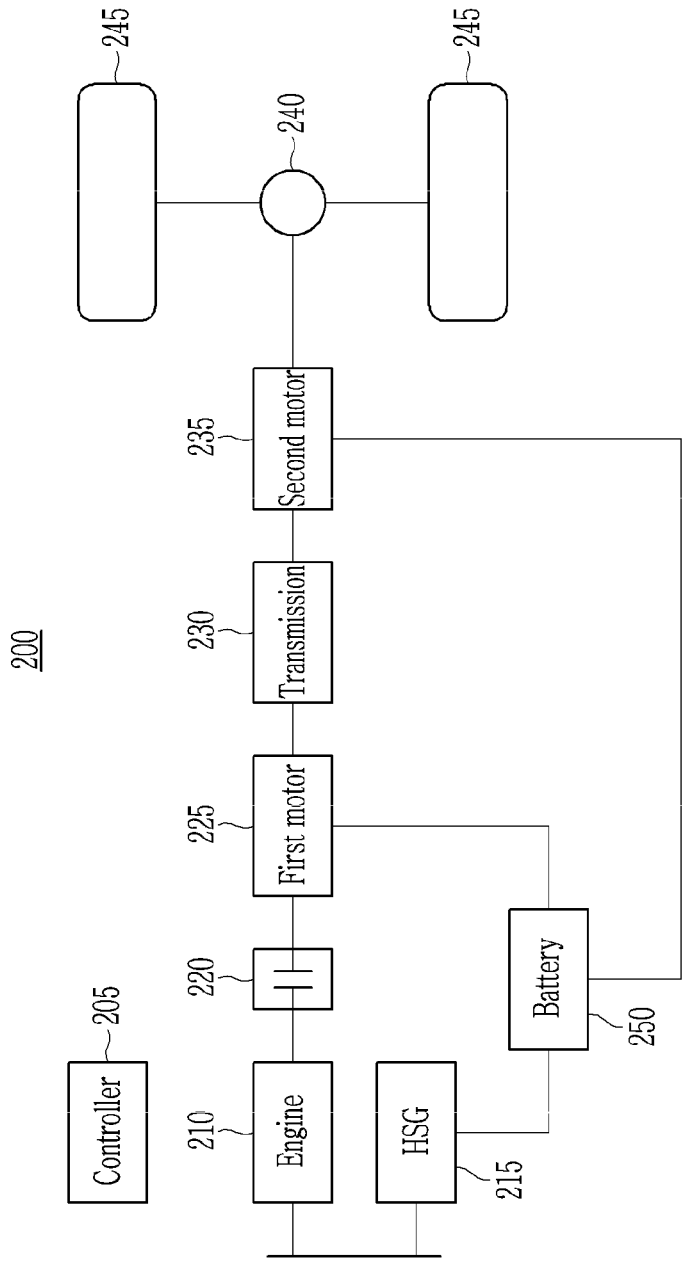

METHOD AND DEVICE FOR CONTROLLING REGENERATIVE BRAKING OF HYBRID VEHICLE

CROSS-REFERENCE TO RELATED APPLICATION

This application claims, under 35 U.S.C. § 119(a), the benefit of Korean Patent Application No. 10-2021-0170758, filed in the Korean Intellectual Property Office on Dec. 2, 2021, the disclosure of which is incorporated herein by reference in its entirety.

BACKGROUND

Technical Field

Embodiments of the present disclosure relate to a vehicle and, more particularly, to a method and a device for controlling regenerative braking of a hybrid vehicle.

Description of the Related Art

In general, a hybrid vehicle, which is a type of eco-friendly vehicle, is a vehicle that efficiently combines and uses two or more different types of power sources. In particular, a hybrid vehicle is a vehicle driven by an engine, which combusts fuel and obtains rotational force, and a motor, which obtains rotational force with power of a battery.

A hybrid vehicle may be formed using any of a number of various structures that includes the use of two or more power sources formed by the engine and the motor. The motor provided in the hybrid vehicle serves to assist the power of the engine during acceleration or hill driving.

A driving mode of the hybrid vehicle includes an Electric Vehicle (EV) mode, which is a pure electric vehicle mode that only uses motor power, a Hybrid Electric Vehicle (HEV) mode, which uses the engine as the main power while using the motor as the auxiliary power, and a regenerative braking mode, in which braking energy of the vehicle is collected through power generation in the motor and charged in the battery when the vehicle is driven by braking.

Regenerative braking is a technology in which electric energy is generated in a motor by applying reverse torque to an electric motor by using energy generated during braking in order to maximize fuel efficiency of an eco-friendly vehicle. The generated electric energy is stored in a high-voltage battery and is re-usable during the driving of the vehicle, and is applied to eco-friendly vehicles, such as a hybrid vehicle, an electric vehicle, or a fuel cell vehicle.

Regenerative braking is the technology for converting energy to electric energy during braking, and is directly connected with fuel efficiency. The increase in the amount of regenerative braking means improvement of fuel efficiency. In the case of hybrid vehicles, compared to a general vehicle, regenerative braking plays a major role in improving fuel efficiency to the extent that regenerative braking exhibits most of the effect of improving fuel efficiency.

The above information disclosed in this Background section is only for enhancement of understanding of the background of the present disclosure, and therefore it may contain information that does not form the existing technologies that are already known in this country to a person of ordinary skill in the art.

SUMMARY

Embodiments of the present disclosure have been made in an effort to provide a method and a device for controlling regenerative braking of a hybrid vehicle, which improve fuel efficiency of a hybrid vehicle by regenerative braking of motors included in the hybrid vehicle.

An exemplary embodiment of the present disclosure provides a method of controlling regenerative braking of a hybrid vehicle, the method including controlling, by a controller, a hybrid vehicle to start a braking operation in response to a brake pedal operation signal, and, after the braking operation of the hybrid vehicle is started, controlling, by the controller, a second motor that is connected to an output shaft of a transmission of the hybrid vehicle to perform regenerative braking.

The method may further include determining, by the controller, whether the second motor has generate a maximum amount of regenerative braking and whether the maximum amount of regenerative braking of the second motor is less than an amount of demanded braking of the hybrid vehicle corresponding to the brake pedal operation signal. The method may further include, when the second motor has generated the maximum amount of regenerative braking and the maximum amount of regenerative braking of the second motor is less than the amount of demanded braking of the hybrid vehicle, calculating, by the controller, an amount of regenerative braking of a first motor connected to an input shaft of the transmission based on the amount of demanded braking of the hybrid vehicle, the maximum amount of regenerative braking of the second motor, and a friction force of the transmission. The method may further include controlling, by the controller, the first motor to perform the regenerative braking based on the amount of regenerative braking of the first motor.

The method may further include controlling, by the controller, whether the first motor has generated a maximum amount of regenerative braking and whether a value of a sum of the maximum amount of regenerative braking of the second motor, the maximum amount of regenerative braking of the first motor, and the friction force of the transmission is less than the amount of demanded braking of the hybrid vehicle. The method may further include, when the first motor has generated the maximum amount of regenerative braking and the value of the sum of the maximum amount of regenerative braking of the second motor, the maximum amount of regenerative braking of the first motor, and the friction force of the transmission is less than the amount of demanded braking of the hybrid vehicle, calculating, by the controller, the amount of regenerative braking of a hybrid starter-generator that starts the engine based on the amount of demanded braking of the hybrid vehicle, the maximum amount of regenerative braking of the second motor, the friction force of the transmission, the maximum amount of regenerative braking of the first motor, and friction force of the engine of the hybrid vehicle. The method may further include, after the engine clutch that connects or disconnects the engine and the first motor is engaged, controlling, by the controller, the hybrid starter-generator to perform the regenerative braking based on the amount of regenerative braking of the hybrid starter-generator.

The method may further include calculating, by the controller, an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the hybrid starter-generator. The method may further include controlling, by the controller, a brake device of the hybrid vehicle to perform hydraulic braking based on the amount of hydraulic braking.

The method may further include determining, by the controller, whether a speed of the hybrid vehicle is less than a vehicle speed reference value. According to an exemplary embodiment, when the speed of the hybrid vehicle is less than the vehicle speed reference value, the controller may be configured to control the first motor connected to an input shaft of the transmission to perform the regenerative braking.

The method may further include determining, by the controller, whether the first motor has generated the maximum amount of regenerative braking, and whether the maximum amount of regenerative braking of the first motor is less than the amount of demanded braking of the hybrid vehicle corresponding to the brake pedal operation signal. The method may further include, when the first motor has generated the maximum amount of regenerative braking and the maximum amount of regenerative braking of the first motor is less than the amount of demanded braking of the hybrid vehicle, calculating, by the controller, the amount of regenerative braking of the second motor based on the amount of demanded braking of the hybrid vehicle corresponding to the brake pedal operation signal, the maximum amount of regenerative braking of the first motor, and friction force of the transmission. The method may further include controlling, by the controller, the second motor to perform the regenerative braking based on the amount of regenerative braking of the second motor.

The method may further include determining, by the controller, whether the second motor has generated the maximum amount of regenerative braking and whether a value of a sum of the maximum amount of regenerative braking of the first motor, the maximum amount of regenerative braking of the second motor, and the friction force of the transmission is less than the amount of demanded braking of the hybrid vehicle. The method may further include, when the second motor has generated the maximum amount of regenerative braking and the value of the sum of the maximum amount of regenerative braking of the first motor, the maximum amount of regenerative braking of the second motor, and the friction force of the transmission is less than the amount of demanded braking of the hybrid vehicle, calculating, by the controller, the amount of regenerative braking of a hybrid starter-generator that starts the engine based on the amount of demanded braking of the hybrid vehicle, the maximum amount of regenerative braking of the first motor, the friction force of the transmission, the maximum amount of regenerative braking of the second motor, and friction force of the engine of the hybrid vehicle. The method may further include, after the engine clutch that connects or disconnects the engine and the first motor is engaged, controlling, by the controller, the hybrid starter-generator to perform the regenerative braking based on the amount of regenerative braking of the hybrid starter-generator.

The method may further include calculating, by the controller, the amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the hybrid starter-generator. The method may further include controlling, by the controller, a brake device of the hybrid vehicle to perform hydraulic braking based on the amount of hydraulic braking.

Another exemplary embodiment of the present disclosure provides a device for controlling regenerative braking of a hybrid vehicle, the device including a second motor connected to an output shaft of a transmission of a hybrid vehicle, and a controller configured to control the hybrid vehicle to start a braking operation in response to a brake pedal operation signal, in which, after the braking operation of the hybrid vehicle is started, the controller may be configured to control the second motor to perform regenerative braking.

The device may further include a first motor connected to an input shaft of the transmission, in which the controller may be further configured to determine whether the second motor has generated a maximum amount of regenerative braking, and whether the maximum amount of regenerative braking of the second motor is less than an amount of demanded braking of the hybrid vehicle corresponding to the brake pedal operation signal. When the second motor has generated the maximum amount of regenerative braking and the maximum amount of regenerative braking of the second motor is less than the amount of demanded braking of the hybrid vehicle, the controller may be configured to calculate an amount of regenerative braking of the first motor based on the amount of demanded braking of the hybrid vehicle, the maximum amount of regenerative braking of the second motor, and friction force of the transmission. The controller may be further configured to control the first motor to perform the regenerative braking based on the amount of regenerative braking of the first motor.

The device may further include a hybrid starter-generator which is configured to start an engine of the hybrid vehicle, in which the controller may be configured to determine whether the first motor has generated the maximum amount of regenerative braking and whether a value of a sum of the maximum amount of regenerative braking of the second motor, the maximum amount of regenerative braking of the first motor, and the friction force of the transmission is less than the amount of demanded braking of the hybrid vehicle. When the first motor has generated the maximum amount of regenerative braking and the value of the sum of the maximum amount of regenerative braking of the second motor, the maximum amount of regenerative braking of the first motor, and the friction force of the transmission is less than the amount of demanded braking of the hybrid vehicle, the controller may be configured to calculate the amount of regenerative braking of the hybrid starter-generator based on the amount of demanded braking of the hybrid vehicle, the maximum amount of regenerative braking of the second motor, the friction force of the transmission, the maximum amount of regenerative braking of the first motor, and a friction force of the engine. After the engine clutch that connects or disconnects the engine and the first motor is engaged, the controller may be configured to control the hybrid starter-generator to perform the regenerative braking based on the amount of regenerative braking of the hybrid starter-generator.

The controller may be further configured to calculate an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the hybrid starter-generator, and the controller may be further configured to control a brake device of the hybrid vehicle to perform hydraulic braking based on the amount of hydraulic braking.

The device may further include a first motor connected to an input shaft of the transmission, in which the controller may be further configured to determine whether a speed of the hybrid vehicle is less than a vehicle speed reference value. According to an exemplary embodiment, when the speed of the hybrid vehicle is less than the vehicle speed reference value, the controller may be configured to control the first motor to perform the regenerative braking.

The controller may be further configured to determine whether the first motor has generated a maximum amount of regenerative braking, and whether the maximum amount of regenerative braking of the first motor is less than an amount of demanded braking of the hybrid vehicle corresponding to the brake pedal operation signal. When the first motor has generated the maximum amount of regenerative braking and the maximum amount of regenerative braking of the first motor is less than the amount of demanded braking of the hybrid vehicle, the controller may be further configured to calculate an amount of regenerative braking of the second motor based on the amount of demanded braking of the hybrid vehicle, the maximum amount of regenerative braking of the first motor, and friction force of the transmission, and the controller may control the second motor to perform the regenerative braking based on the amount of regenerative braking of the second motor.

The device may further include a hybrid starter-generator which may be configured to start an engine of the hybrid vehicle, in which the controller may be further configured to determine whether the second motor has generated the maximum amount of regenerative braking, and whether a value of a sum of the maximum amount of regenerative braking of the first motor, the maximum amount of regenerative braking of the second motor, and the friction force of the transmission is less than the amount of demanded braking of the hybrid vehicle. When the second motor has generated the maximum amount of regenerative braking and the value of the sum of the maximum amount of regenerative braking of the first motor, the maximum amount of regenerative braking of the second motor, and the friction force of the transmission is less than the amount of demanded braking of the hybrid vehicle, the controller may be further configured to calculate the amount of regenerative braking of the hybrid starter-generator based on the amount of demanded braking of the hybrid vehicle, the maximum amount of regenerative braking of the first motor, the friction force of the transmission, the maximum amount of regenerative braking of the second motor, and friction force of the engine. After the engine clutch that connects or disconnects the engine and the first motor is engaged, the controller may be further configured to control the hybrid starter-generator to perform the regenerative braking based on the amount of regenerative braking of the hybrid starter-generator.

The controller may be further configured to calculate an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the hybrid starter-generator. The controller may be further configured to control a brake device of the hybrid vehicle to perform hydraulic braking based on the amount of hydraulic braking.

According to still another exemplary embodiment of the present disclosure, a method of controlling regenerative braking of a hybrid vehicle is provided. The method includes, after a braking operation of a hybrid vehicle starts, controlling, by a controller, a second motor connected to an output shaft of a transmission of the hybrid vehicle to perform regenerative braking. The method may further include determining, by the controller, whether the second motor has generated a maximum amount of regenerative braking and whether the maximum amount of regenerative braking of the second motor is less than the amount of demanded braking of the hybrid vehicle corresponding to a brake pedal operation signal. The method may further include, when the second motor has generated the maximum amount of regenerative braking and the maximum amount of regenerative braking of the second motor is less than the amount of demanded braking of the hybrid vehicle, calculating, by the controller, an amount of regenerative braking of the first motor connected to an input shaft of the transmission based on the amount of demanded braking of the hybrid vehicle, the maximum amount of regenerative braking of the second motor, and friction force of the transmission. The method may further include controlling, by the controller, the first motor to perform the regenerative braking based on the amount of regenerative braking of the first motor.

The methods and the devices for controlling regenerative braking of the hybrid vehicle according to the exemplary embodiments of the present disclosure may improve fuel efficiency of a hybrid vehicle by regenerative braking of the motors included in the hybrid vehicle.

BRIEF DESCRIPTION OF THE DRAWINGS

In order to help more full understanding of the drawings used in the detailed description of the present disclosure, a brief description of each drawing is provided.

FIG. 2 is a block diagram illustrating a device for controlling regenerative braking of a hybrid vehicle to which the method of controlling regenerative braking of the hybrid vehicle, illustrated in FIG. 1, is applied, according to an exemplary embodiment of the present disclosure.

DETAILED DESCRIPTION

Figure 1:
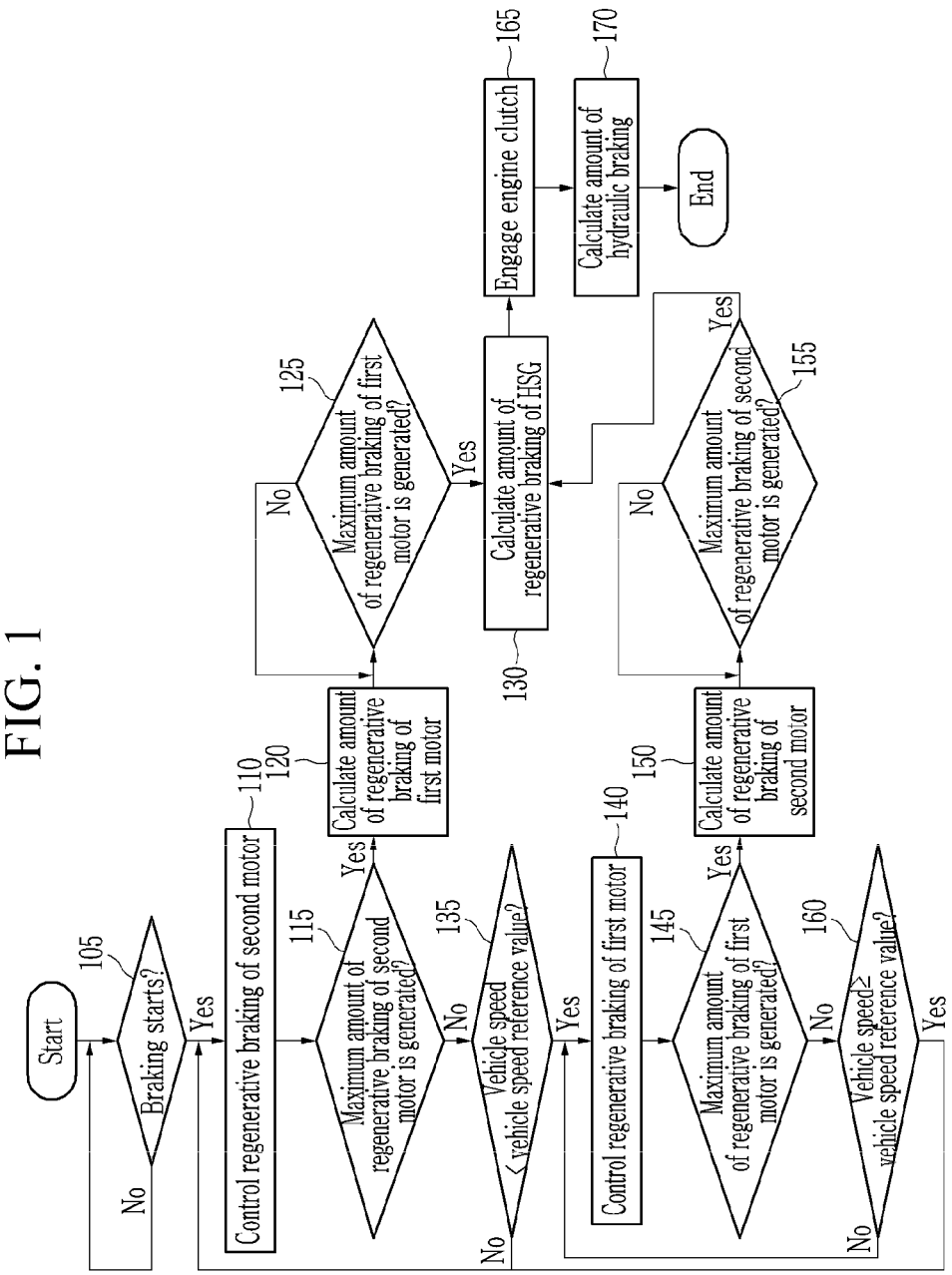
FIG. 1 is a flowchart for describing a method of controlling regenerative braking of a hybrid vehicle according to an exemplary embodiment of the present disclosure.

In order to fully understand the present disclosure and the object achieved by the implementation of the present disclosure, reference should be made to the accompanying drawings illustrating the exemplary embodiment of the present disclosure and the contents described in the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, the present disclosure will be described in detail by describing the exemplary embodiment of the present disclosure with reference to the accompanying drawings. In the following description of the exemplary embodiment, a detailed description of known configurations or functions incorporated herein will be omitted when it is judged that the detailed description may make the subject matter of the present disclosure unclear. Like reference numerals presented in each drawing designate like elements throughout the specification.

The term used in the present specification is simply used for describing a specific embodiment and does not intend to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to the another element or "electrically or mechanically coupled" to the another element a still another element interposed therebetween.

All terms used herein including technical or scientific terms have the same meanings as meanings which are generally understood by those skilled in the art to which the present disclosure pertains unless they are differently defined. Terms defined in generally used dictionary shall be construed to have meanings matching those in the context of a related art, and shall not be construed as ideal or excessively formal meanings unless they are clearly defined in the present application.

FIG. 1 is a flowchart for describing a method of controlling regenerative braking of a hybrid vehicle according to an exemplary embodiment of the present disclosure. FIG. 2 is a block diagram illustrating a device for controlling regenerative braking of a hybrid vehicle to which the method of controlling regenerative braking of the hybrid vehicle illustrated in FIG. 1 is applied.

Referring to FIGS. 1 and 2, in a determination operation 105, a controller 205 may be configured to control a hybrid vehicle 200 to start a braking operation in response to a brake pedal operation signal. The brake pedal operation signal may be generated when a driver of the hybrid vehicle 200 depresses the brake pedal of the hybrid vehicle.

As illustrated in FIG. 2, the hybrid vehicle 200 may include the controller 205, an engine 210, a hybrid starter-generator (HSG) (or a starter-generator) 215, an engine clutch 220, a first motor 225, a transmission 230, a second motor 235, a final reduction gear device 240 that is a decelerator, driving wheels 245, and a battery 250. The device for controlling regenerative braking of the hybrid vehicle may include the controller 205, the HSG 215, the first motor 225, and the second motor 235.

The controller 205 may be configured to control the overall operation of the hybrid vehicle 200 as an electronic control unit. The controller 205 may include one or more microprocessors operated by a program (control logic) or hardware (for example, a microcomputer) including the microprocessor, and the program may include a series of instructions for performing the method of controlling regenerative braking of the hybrid vehicle according to an exemplary embodiment of the present disclosure. The instruction may be stored in a memory of the hybrid vehicle 200.

The controller 205 may include a hybrid control unit (HCU), a motor control unit (MCU), an engine control unit (ECU), and/or a transmission control unit (TCU).

The hybrid vehicle 200 may be a hybrid electric vehicle, and may use the engine 210 and the first motor 225 as power sources, and the engine clutch 220 may be present between the first motor 225 and the engine 210, so that the hybrid vehicle may be operated in an Electric Vehicle (EV) mode in which the vehicle travels by the first motor 225 (or the second motor 235) in the state where the engine clutch 220 is opened, and the vehicle may be operated in a Hybrid Electric Vehicle (HEV) mode in which the vehicle may be capable of travelling by the engine 210 and the first motor 225 (or the second motor 235) in the state where the engine clutch 220 is closed.

The HSG 215 may be operated as an electric motor or as a generator, and the HSG 215 may be operated as an electric motor according to a control signal output from the controller 205 to start the engine 210, and may be operated as a generator in the state where the starting of the engine 210 is maintained to generate voltage and provide the generated voltage to the battery 250 as charging voltage. The HSG 215 may be connected to the engine 210 through a belt. The HSG 215 may also be mentioned as a P0 motor. In another exemplary embodiment of the present disclosure, the HSG 215 may be installed (disposed) between the engine 210 and the engine clutch 220, and may also be mentioned as a P1 motor.

The first motor 225 is a driving motor and may be connected to an input shaft of the transmission 230, and may also be mentioned as a P2 motor. The first motor 225 may be installed (disposed) between the engine clutch 220 and the transmission 230. The first motor 225 may be operated as a generator in coasting drive or regenerative braking to supply regenerative energy to the battery 250.

The battery 250 may be formed of a plurality of unit cells and, for example, a high direct-current voltage of 260 V to 450 V may be stored in the battery 250 for providing a voltage to the first motor 225, the second motor 235, or the HSG 215.

The second motor 235 may be a driving motor and may be connected to an output shaft of the transmission 230, and may also be mentioned as a P3 motor. The second motor 235 may be installed (disposed) between the transmission 230 and the decelerator 240. The second motor 235 may be operated as a generator in coasting drive or regenerative braking to supply regenerative energy to the battery 250.

According to an operation 110 illustrated in FIG. 1, after the braking operation of the hybrid vehicle 200 starts, the controller 205 may be configured to control the second motor 235 to first perform regenerative braking. The second motor 235 may be connected to the output shaft of the transmission 230 and may be connected to the driving wheel 245 through the decelerator 240, so that a regenerative braking loss of the second motor 235 may be smaller than a regenerative braking loss of the first motor 225. Therefore, regenerative braking efficiency of the second motor 235 may be larger than regenerative braking efficiency of the first motor 225, so that the controller 205 may be configured to control the second motor 235 to first perform regenerative braking.

When the regenerative braking is performed, in order to improve fuel efficiency of the hybrid vehicle 200 by reducing drag caused by the transmission 230 and the first motor 225, the controller 205 may be configured to control a gear shift stage of the transmission 230 to a neutral stage. The regenerative braking may be performed by the driving wheels 245, the final reduction gear device 240, the second motor 235, and/or the battery 250.

According to an operation 115, after the operation 110, the controller 205 may be configured to determine whether the second motor 235 generates the maximum amount of regenerative braking. Further, the controller 205 may be configured to determine whether the maximum amount of regenerative braking of the second motor 235 is less than the amount of demanded braking of the hybrid vehicle 200 corresponding to the brake pedal operation signal. The maximum amount of regenerative braking of the second motor 235 may be determined by an output (capacity or output capacity) of the second motor.

When the second motor 235 generates the maximum amount of regenerative braking and the maximum amount of regenerative braking of the second motor 235 is less than the amount of demanded braking of the hybrid vehicle 200, the method of controlling regenerative braking of the hybrid vehicle may include performing an operation 120, and when the second motor 235 does not generate the maximum amount of regenerative braking, the method of controlling regenerative braking of the hybrid vehicle may include performing an operation 135.

According to the operation 120, the controller 205 may be configured to calculate (predict) the amount of regenerative braking of the first motor 225 based on the amount of demanded braking of the hybrid vehicle 200 corresponding to the brake pedal operation signal, the maximum amount of regenerative braking of the second motor 235, and a friction force (or the amount of friction) of the transmission 230. For example, the controller 205 may be configured to calculate the amount of regenerative braking of the first motor 225 by subtracting the maximum amount of regenerative braking of the second motor 235 and the friction force of the transmission 230 from the amount of demanded braking of the hybrid vehicle 200.

The controller 205 may be configured to control the first motor 225 to perform regenerative braking based on the amount of regenerative braking of the first motor 225. The regenerative braking may be performed by the driving wheels 245, the final reduction gear device 240, the transmission 230, the first motor 225, and/or the battery 250.

According to an operation 125, after the operation 120, the controller 205 may be configured to determine whether the first motor 225 generated the maximum amount of regenerative braking. Further, the controller 205 may be configured to determine whether a value of a sum of the maximum amount of regenerative braking of the second motor 235, the maximum amount of regenerative braking of the first motor 225, and the friction force of the transmission 230 is less than the amount of demanded braking of the hybrid vehicle 200 corresponding to the brake pedal operation signal. The maximum amount of regenerative braking of the first motor 225 may be determined by an output (capacity or output capacity) of the first motor.

According to the operation 130, when the first motor 225 generates the maximum amount of regenerative braking, the value of the sum of the maximum amount of regenerative braking of the second motor 235, the maximum amount of regenerative braking of the first motor 225 and the friction force of the transmission 230 is less than the amount of demanded braking of the hybrid vehicle 200, the controller 205 may be configured to calculate (predict) the amount of regenerative braking of the HSG 215 based on the amount of demanded braking of the hybrid vehicle 200 corresponding to the brake pedal operation signal, the maximum amount of regenerative braking of the second motor 235, the friction force of the transmission 230, the maximum amount of regenerative braking of the first motor 225, and the friction force (or the amount of friction) of the engine 210. For example, the controller 205 may be configured to calculate the amount of regenerative braking of the HSG 215 by subtracting the maximum amount of regenerative braking of the second motor 235, the friction force of the transmission 230, the maximum amount of regenerative braking of the first motor 225, and the friction force of the engine 210 from the amount of demanded braking of the hybrid vehicle 200.

According to the operation 165, after the operation 130, the controller 205 may be configured to engage the engine clutch 220 that connects or disconnects the engine 210 and the first motor 225. The controller 205 may be configured to control the HSG 215 to perform the regenerative braking based on the amount of regenerative braking of the HSG 215. The regenerative braking may be performed by the driving wheels 245, the final reduction gear device 240, the transmission 230, the engine clutch 220, the engine 210, the HSG 215, and the battery 250. In another exemplary embodiment of the present disclosure, before the engine clutch 220 is engaged, the controller 205 may be configured to control the speed of the engine to be the same as the speed of the first motor 225 by operating the engine 210 to control the fuel not to be supplied to the engine.

According to an operation 170, after the operation 165, the controller 205 may be configured to calculate the amount of hydraulic braking of the hybrid vehicle 200 based on the amount of demanded braking of the hybrid vehicle 200 corresponding to the brake pedal operation signal, the maximum amount of regenerative braking of the second motor 235, the friction force of the transmission 230, the maximum amount of regenerative braking of the first motor 225, the friction force of the engine 210, and the maximum amount of regenerative braking of the HSG 215. For example, the controller 205 may be configured to calculate the amount of hydraulic braking of the hybrid vehicle 200 by subtracting the maximum amount of regenerative braking of the second motor 235, the friction force of the transmission 230, the maximum amount of regenerative braking of the first motor 225, the friction force of the engine 210, and the maximum amount of regenerative braking of the HSG 215 from the amount of demanded braking of the hybrid vehicle 200. The maximum amount of regenerative braking of the HSG 215 may be determined by an output (capacity or output capacity) of the HSG.

The controller 205 may be configured to control a brake device (or a hydraulic braking device) of the hybrid vehicle to perform hydraulic braking (frictional braking) based on the amount of hydraulic braking of the hybrid vehicle 200.

According to the operation 135, the controller 205 may be configured to determine whether a speed of the hybrid vehicle 200 is less than a vehicle speed reference value.

When the speed of the hybrid vehicle 200 is less than the vehicle speed reference value, the method of controlling regenerative braking of the hybrid vehicle may include performing an operation 140, and when the speed of the hybrid vehicle 200 is equal to or greater than the vehicle speed reference value, the method of controlling regenerative braking of the hybrid vehicle may include performing the operation 110.

According to the operation 140, the controller 205 may be configured to perform the first motor 225 to perform the regenerative braking. When the speed of the hybrid vehicle 200 is low, the second motor 235 may be connected to the output shaft of the transmission 230, so that regenerative braking efficiency of the second motor 235 may be degraded. Therefore, when the speed of the hybrid vehicle 200 is less than the vehicle speed reference value, the controller 205 may be configured to perform the first motor 225 to perform the regenerative braking. The vehicle speed reference value may be determined by a test (or an experiment).

According to an operation 145, after the operation 140, the controller 205 may be configured to determine whether the first motor 225 generated the maximum amount of regenerative braking. Further, the controller 205 may be configured to determine whether the maximum amount of regenerative braking of the first motor 225 is less than the amount of demanded braking of the hybrid vehicle 200 corresponding to the brake pedal operation signal. The maximum amount of regenerative braking of the first motor 225 may be determined by an output (capacity or output capacity) of the first motor.

When the first motor 225 generates the maximum amount of regenerative braking and the maximum amount of regenerative braking of the first motor 225 is less than the amount of demanded braking of the hybrid vehicle 200, the method of controlling regenerative braking of the hybrid vehicle may include performing an operation 150, and when the first motor 225 does not generate the maximum amount of regenerative braking, the method of controlling regenerative braking of the hybrid vehicle may include performing an operation 160.

According to the operation 160, the controller 205 may be configured to determine whether the speed of the hybrid vehicle 200 is equal to or greater than the vehicle speed reference value.

When the speed of the hybrid vehicle 200 is equal to or greater than the vehicle speed reference value, the method of controlling regenerative braking of the hybrid vehicle may include performing an operation 110, and when the speed of the hybrid vehicle 200 is less than the vehicle speed reference value, the method of controlling regenerative braking of the hybrid vehicle may include performing the operation 140.

According to the operation 150, the controller 205 may be configured to calculate (predict) the amount of regenerative braking of the second motor 235 based on the amount of demanded braking of the hybrid vehicle 200 corresponding to the brake pedal operation signal, the maximum amount of regenerative braking of the first motor 225, and the friction force of the transmission 230. For example, the controller 205 may be configured to calculate the amount of regenerative braking of the second motor 235 by subtracting the maximum amount of regenerative braking of the first motor 225 and the friction force of the transmission 230 from the amount of demanded braking of the hybrid vehicle 200.

The controller 205 may be configured to control the second motor 235 to perform regenerative braking based on the amount of regenerative braking of the second motor 235.

According to the operation 155, after the operation 150, the controller 205 may be configured to determine whether the second motor 235 generated the maximum amount of regenerative braking. Further, the controller 205 may be configured to determine whether a value of a sum of the maximum amount of regenerative braking of the first motor 225, the maximum amount of regenerative braking of the second motor 235, and the friction force of the transmission 230 is less than the amount of demanded braking of the hybrid vehicle 200 corresponding to the brake pedal operation signal. The maximum amount of regenerative braking of the second motor 235 may be determined by an output (capacity or output capacity) of the second motor.

When the second motor 235 generates the maximum amount of regenerative braking and the value of the sum of the maximum amount of regenerative braking of the first motor 225, the maximum amount of regenerative braking of the second motor 235, and the friction force of the transmission 230 is less than the amount of demanded braking of the hybrid vehicle 200, the operation 130 may be performed.

The constituent element, "~unit", a block, or a module used in the exemplary embodiment of the present disclosure, may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, "~unit" or the like may also be included in a computer readable storage medium, and a part thereof may be distributed in the plurality of computers.

As described above, the exemplary embodiments have been disclosed in the drawings and the specification. The specific terms are used herein, but are only used for the purpose of describing the present disclosure, and are not used to limit the meaning or the scope of the present disclosure described in the claims. Accordingly, those skilled in the art will appreciate that various modifications and equivalent embodiments may be made without departing from the scope and spirit of the present disclosure. Therefore, the true technical protection scope of the present disclosure will be defined by the technical spirit of the accompanying claims.

What is claimed is:

1. A method of controlling regenerative braking of a hybrid vehicle, the method comprising:
controlling, by a controller, a hybrid vehicle to start a braking operation in response to a brake pedal operation signal;
after the braking operation of the hybrid vehicle is started, controlling, by the controller, a second motor that is connected to an output shaft of a transmission of the hybrid vehicle to perform regenerative braking;
determining, by the controller:
whether the second motor has generated a maximum amount of regenerative braking, and
whether the maximum amount of regenerative braking of the second motor is less than an amount of demanded braking of the hybrid vehicle corresponding to the brake pedal operation signal;
when the second motor has generated the maximum amount of regenerative braking and the maximum amount of regenerative braking of the second motor is less than the amount of demanded braking of the hybrid vehicle, calculating, by the controller, an amount of regenerative braking of a first motor connected to an input shaft of the transmission based on the amount of demanded braking of the hybrid vehicle, the maximum amount of regenerative braking of the second motor, and a friction force of the transmission; and
controlling, by the controller, the first motor to perform the regenerative braking based on the amount of regenerative braking of the first motor.

2. The method of claim 1, further comprising:
determining, by the controller:
whether the first motor has generated a maximum amount of regenerative braking, and
whether a value of a sum of the maximum amount of regenerative braking of the second motor, the maximum amount of regenerative braking of the first motor, and the friction force of the transmission is less than the amount of demanded braking of the hybrid vehicle;
when the first motor has generated the maximum amount of regenerative braking and the value of the sum of the maximum amount of regenerative braking of the second motor, the maximum amount of regenerative braking of the first motor, and the friction force of the transmission is less than the amount of demanded braking of the hybrid vehicle, calculating, by the controller, the amount of regenerative braking of a starter-generator that starts a engine based on the amount of demanded braking of the hybrid vehicle, the maximum amount of regenerative braking of the second motor, the friction force of the transmission, the maximum amount of regenerative braking of the first motor, and friction force of the engine of the hybrid vehicle; and
after an engine clutch that connects or disconnects the engine and the first motor is engaged, controlling, by the controller, the starter-generator to perform the regenerative braking based on the amount of regenerative braking of the starter-generator.

3. The method of claim 2, further comprising:
calculating, by the controller, an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the starter-generator; and
controlling, by the controller, a brake device of the hybrid vehicle to perform hydraulic braking based on the amount of hydraulic braking.

4. The method of claim 1, further comprising:
determining, by the controller, whether a speed of the hybrid vehicle is less than a vehicle speed reference value,
wherein, when the speed of the hybrid vehicle is less than the vehicle speed reference value, the controller is configured to control a first motor connected to an input shaft of the transmission to perform the regenerative braking.

5. The method of claim 4, further comprising:
determining, by the controller:
whether the first motor has generated a maximum amount of regenerative braking, and
whether the maximum amount of regenerative braking of the first motor is less than an amount of demanded braking of the hybrid vehicle corresponding to the brake pedal operation signal;
when the first motor has generated the maximum amount of regenerative braking and the maximum amount of regenerative braking of the first motor is less than the amount of demanded braking of the hybrid vehicle, calculating, by the controller, an amount of regenerative braking of the second motor based on the amount of demanded braking of the hybrid vehicle corresponding to the brake pedal operation signal, the maximum amount of regenerative braking of the first motor, and friction force of the transmission; and
controlling, by the controller, the second motor to perform the regenerative braking based on the amount of regenerative braking of the second motor.

6. The method of claim 5, further comprising:
determining, by the controller:
whether the second motor has generated the maximum amount of regenerative braking, and
whether a value of a sum of the maximum amount of regenerative braking of the first motor, the maximum amount of regenerative braking of the second motor, and the friction force of the transmission is less than the amount of demanded braking of the hybrid vehicle;
when the second motor has generated the maximum amount of regenerative braking and the value of the sum of the maximum amount of regenerative braking of the first motor, the maximum amount of regenerative braking of the second motor, and a friction force of the transmission is less than the amount of demanded braking of the hybrid vehicle, calculating, by the controller, the amount of regenerative braking of a starter-generator that starts an engine of the hybrid vehicle based on the amount of demanded braking of the hybrid vehicle, the maximum amount of regenerative braking of the first motor, the friction force of the transmission, the maximum amount of regenerative braking of the second motor, and a friction force of the engine of the hybrid vehicle; and after an engine clutch that connects or disconnects the engine and the first motor is engaged, controlling, by the controller, the starter-generator to perform the regenerative braking based on the amount of regenerative braking of the starter-generator.

7. The method of claim 6, further comprising:
calculating, by the controller, an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the starter-generator; and
controlling, by the controller, a brake device of the hybrid vehicle to perform hydraulic braking based on the amount of hydraulic braking.

8. A device for controlling regenerative braking of a hybrid vehicle, the device comprising:
a second motor connected to an output shaft of a transmission of a hybrid vehicle;
a controller configured to:
control the hybrid vehicle to start a braking operation in response to a brake pedal operation signal, and
after the braking operation of the hybrid vehicle is started, control the second motor to perform regenerative braking; and
a first motor connected to an input shaft of the transmission,
wherein the controller is configured to determine:
whether the second motor has generated a maximum amount of regenerative braking, and
whether the maximum amount of regenerative braking of the second motor is less than an amount of demanded braking of the hybrid vehicle corresponding to the brake pedal operation signal;
when the second motor has generated the maximum amount of regenerative braking and the maximum amount of regenerative braking of the second motor is less than the amount of demanded braking of the hybrid vehicle, the controller is configured to calculate:
an amount of regenerative braking of the first motor based on the amount of demanded braking of the hybrid vehicle,
the maximum amount of regenerative braking of the second motor, and
a friction force of the transmission, and
the controller is configured to control the first motor to perform the regenerative braking based on the amount of regenerative braking of the first motor.

9. The device of claim 8, further comprising:
a starter-generator configured to start an engine of the hybrid vehicle,
wherein the controller is further configured to determine:
whether the first motor has generated the maximum amount of regenerative braking, and
whether a value of a sum of the maximum amount of regenerative braking of the second motor, the maximum amount of regenerative braking of the first motor, and the friction force of the transmission is less than the amount of demanded braking of the hybrid vehicle;
when the first motor has generated the maximum amount of regenerative braking and the value of the sum of the maximum amount of regenerative braking of the second motor, the maximum amount of regenerative braking of the first motor, and the friction force of the transmission is less than the amount of demanded braking of the hybrid vehicle, the controller is further configured to calculate the amount of regenerative braking of the starter-generator based on the amount of demanded braking of the hybrid vehicle, the maximum amount of regenerative braking of the second motor, the friction force of the transmission, the maximum amount of regenerative braking of the first motor, and friction force of the engine; and
after an engine clutch that connects or disconnects the engine and the first motor is engaged, the controller is further configured to control the starter-generator to perform the regenerative braking based on the amount of regenerative braking of the starter-generator.

10. The device of claim 9, wherein the controller is further configured to:
calculate an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the starter-generator, and
control a brake device of the hybrid vehicle to perform hydraulic braking based on the amount of hydraulic braking.

11. The device of claim 8, further comprising:
a first motor connected to an input shaft of the transmission,
wherein the controller is further configured to determine whether a speed of the hybrid vehicle is less than a vehicle speed reference value, and
when the speed of the hybrid vehicle is less than the vehicle speed reference value, the controller is further configured to control the first motor to perform the regenerative braking.

12. The device of claim 11, wherein the controller is further configured to:
determine whether the first motor has generated a maximum amount of regenerative braking, and
determine whether the maximum amount of regenerative braking of the first motor is less than an amount of demanded braking of the hybrid vehicle corresponding to the brake pedal operation signal,
when the first motor has generated the maximum amount of regenerative braking and the maximum amount of regenerative braking of the first motor is less than the amount of demanded braking of the hybrid vehicle, calculate an amount of regenerative braking of the second motor based on the amount of demanded braking of the hybrid vehicle, the maximum amount of regenerative braking of the first motor, and a friction force of the transmission, and control the second motor to perform the regenerative braking based on the amount of regenerative braking of the second motor.

13. The device of claim 12, further comprising:

a starter-generator configured to start an engine of the hybrid vehicle, wherein the controller is further configured to:

determine whether the second motor has generated the maximum amount of regenerative braking, and determine whether a value of a sum of the maximum amount of regenerative braking of the first motor, the maximum amount of regenerative braking of the second motor, and the friction force of the transmission is less than the amount of demanded braking of the hybrid vehicle, when the second motor has generated the maximum amount of regenerative braking and the value of the sum of the maximum amount of regenerative braking of the first motor, the maximum amount of regenerative braking of the second motor, and the friction force of the transmission is less than the amount of demanded braking of the hybrid vehicle, calculate the amount of regenerative braking of the starter-generator based on the amount of demanded braking of the hybrid vehicle, the maximum amount of regenerative braking of the first motor, the friction force of the transmission, the maximum amount of regenerative braking of the second motor, and a friction force of the engine, and after an engine clutch that connects or disconnects the engine and the first motor is engaged, control the starter-generator to perform the regenerative braking based on the amount of regenerative braking of the starter-generator.

14. The device of claim 13, wherein the controller is further configured to:

calculate an amount of hydraulic braking of the hybrid vehicle based on the amount of demanded braking of the hybrid vehicle, the maximum amount of regenerative braking of the second motor, the friction force of the transmission, the maximum amount of regenerative braking of the first motor, the friction force of the engine, and the maximum amount of regenerative braking of the starter-generator, and control a brake device of the hybrid vehicle to perform hydraulic braking based on the amount of hydraulic braking.

15. A method of controlling regenerative braking of a hybrid vehicle, the method comprising:

after a braking operation of a hybrid vehicle starts, controlling, by a controller, a second motor connected to an output shaft of a transmission of the hybrid vehicle to perform regenerative braking;

determining, by the controller, whether the second motor has generated a maximum amount of regenerative braking and whether the maximum amount of regenerative braking of the second motor is less than an amount of demanded braking of the hybrid vehicle corresponding to a brake pedal operation signal;

when the second motor has generated the maximum amount of regenerative braking and the maximum amount of regenerative braking of the second motor is less than the amount of demanded braking of the hybrid vehicle, calculating, by the controller, an amount of regenerative braking of a first motor connected to an input shaft of the transmission based on the amount of demanded braking of the hybrid vehicle, the maximum amount of regenerative braking of the second motor, and friction force of the transmission; and controlling, by the controller, the first motor to perform the regenerative braking based on the amount of regenerative braking of the first motor.

\* \* \* \* \*